(12) United States Patent
Stein et al.

(10) Patent No.: US 11,867,890 B2
(45) Date of Patent: Jan. 9, 2024

(54) OPTICAL ELEMENT FOR LIGHT CONCENTRATION AND PRODUCTION METHOD FOR AN OPTICAL ELEMENT FOR LIGHT CONCENTRATION

(71) Applicant: Robert Bosch GmbH, Stuttgart (DE)

(72) Inventors: Benedikt Stein, Stuttgart (DE); Martin Husnik, Stuttgart (DE); Robert Schittny, Oslo (NO); Christoph Daniel Kraemmer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 659 days.

(21) Appl. No.: 17/055,261

(22) PCT Filed: Apr. 10, 2019

(86) PCT No.: PCT/EP2019/059038
§ 371 (c)(1),
(2) Date: Nov. 13, 2020

(87) PCT Pub. No.: WO2019/223929
PCT Pub. Date: Nov. 28, 2019

(65) Prior Publication Data
US 2021/0124159 A1   Apr. 29, 2021

(30) Foreign Application Priority Data
May 24, 2018   (DE) .................. 10 2018 208 185

(51) Int. Cl.
*G02B 19/00*   (2006.01)
*G01J 3/02*    (2006.01)
(Continued)

(52) U.S. Cl.
CPC ........ *G02B 19/0076* (2013.01); *G01J 3/0216* (2013.01); *G01J 3/0256* (2013.01);
(Continued)

(58) Field of Classification Search
CPC .. G02B 5/0242; G02B 5/0247; G02B 5/0263; G02B 5/0268; G02B 5/0278;
(Continued)

(56) References Cited

U.S. PATENT DOCUMENTS 3,780,357 A   12/1973   Haitz
9,316,540 B1   4/2016   Phua
(Continued)

FOREIGN PATENT DOCUMENTS

| CN | 102498428 A | 6/2012 |
| DE | 10 2016 112 750 A1 | 1/2018 |
| WO | 2007/072856 A1 | 6/2007 |

OTHER PUBLICATIONS

International Search Report corresponding to PCT Application No. PCT/EP2019/059038, dated Aug. 8, 2019 (5 pages).

*Primary Examiner* — Sultan Chowdhury
(74) *Attorney, Agent, or Firm* — Maginot, Moore & Beck LLP

(57) ABSTRACT

An optical element for light concentration for a predefined wavelength range, includes a holding sleeve which is formed in such a way that a light passage volume is framed by at least one reflective partial surface of the holding sleeve, and a light transmission element, with which the light passage volume is at least partly filled and which is transmissive, at least for the predefined wavelength range. The light transmission element is at least partly formed from at least one medium that is diffuse for the predefined wavelength range, and has at least one first subregion having at least a first diffusivity and a second subregion having at least a second diffusivity differing from the first diffusivity. The disclosure further relates to a method for producing an optical element for light concentration.

11 Claims, 5 Drawing Sheets

(51) Int. Cl.
*G02B 1/04* (2006.01)
*G02B 5/02* (2006.01)

(52) U.S. Cl.
CPC .............. *G02B 1/04* (2013.01); *G02B 5/0242* (2013.01); *G02B 5/0247* (2013.01); *G02B 5/0263* (2013.01); *G02B 5/0268* (2013.01); *G02B 5/0278* (2013.01); G02B 19/0095 (2013.01)

(58) Field of Classification Search
CPC ................ G02B 19/00; G02B 19/0019; G02B 19/0076; G02B 19/009; G02B 19/0095; G02B 1/00; G02B 1/02; G02B 1/04; G02B 1/045; G02B 1/115; G01J 3/0251; G01J 3/0254; G01J 3/0256; G01J 3/0262; G01J 3/0291; G01J 3/0294; G01J 1/0474; G01J 1/0477; G01J 1/0488; G01J 1/0496
See application file for complete search history.

(56) References Cited

U.S. PATENT DOCUMENTS

| | | | |
|---|---|---|---|
| 2006/0072222 A1 | 4/2006 | Lichy | |
| 2012/0212659 A1 | 8/2012 | Jolma et al. | |
| 2014/0111862 A1* | 4/2014 | Yamamoto | B32B 27/32 427/164 |
| 2014/0160410 A1 | 6/2014 | Yamamoto et al. | |
| 2014/0307447 A1 | 10/2014 | Ohta et al. | |
| 2015/0176801 A1* | 6/2015 | Takatori | F21V 5/08 362/307 |
| 2015/0301398 A1 | 10/2015 | Yui et al. | |
| 2018/0006176 A1* | 1/2018 | Pau | H01L 31/0504 |

\* cited by examiner

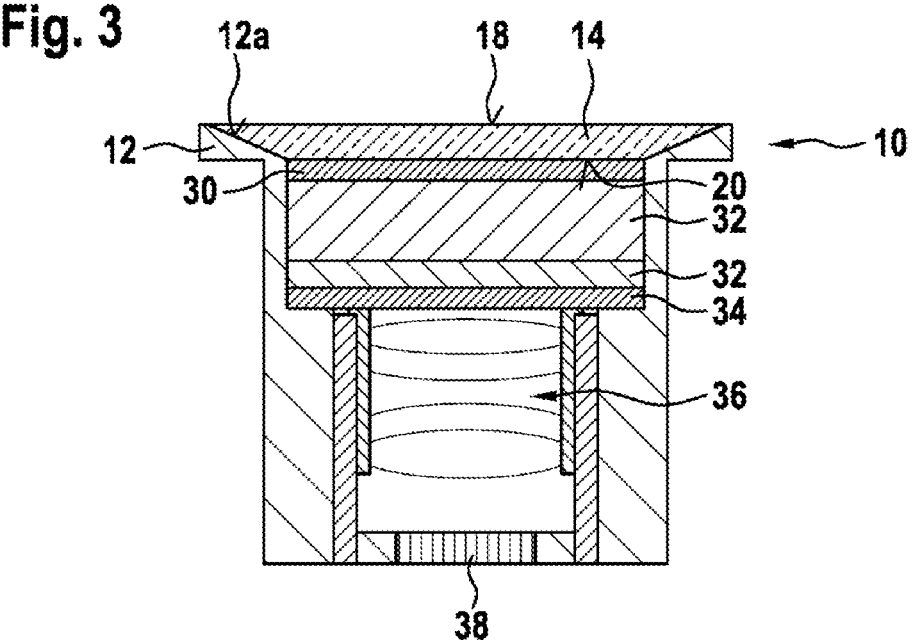
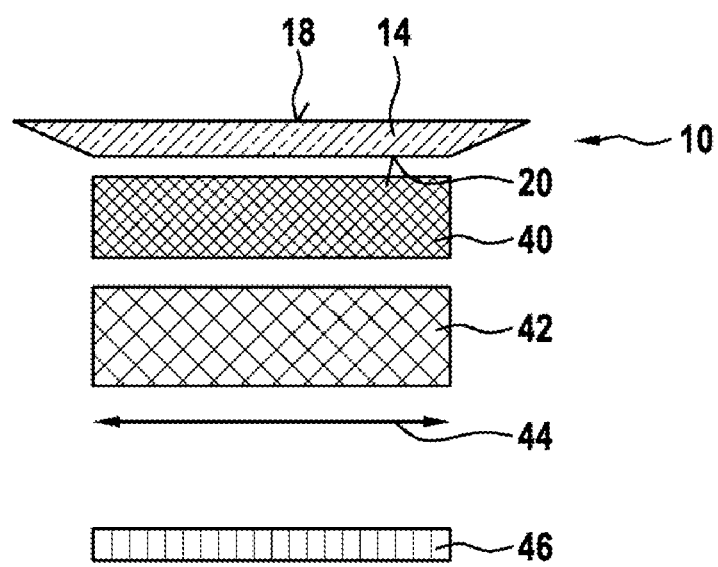

OPTICAL ELEMENT FOR LIGHT CONCENTRATION AND PRODUCTION METHOD FOR AN OPTICAL ELEMENT FOR LIGHT CONCENTRATION This application is a 35 U.S.C. § 371 National Stage Application of PCT/EP2019/059038, filed on Apr. 10, 2019, which claims the benefit of priority to Serial No. DE 10 2018 208 185.9, filed on May 24, 2018 in Germany, the disclosures of which are incorporated herein by reference in their entirety.

The disclosure relates to an optical element for light concentration. The disclosure also relates to a spectrometer and to a mobile apparatus. The disclosure furthermore relates to a production method for an optical element for light concentration.

BACKGROUND

U.S. Pat. No. 9,316,540 B1 describes, as one embodiment, a spectrometer which has a light-focusing lens as light incidence optics/frontal optics and an aperture. A diffuser is arranged after the light incidence optics/frontal optics.

SUMMARY

The disclosure provides an optical element for light concentration, a spectrometer, a mobile apparatus, and a production method for an optical element for light concentration having the features described below.

The present disclosure allows integration of a diffuser into an optical element for light concentration. The optical element according to the disclosure may therefore additionally fulfill the functions of a diffuser, so that it is possible to economize on a conventionally additionally required diffuser. By means of the present disclosure, it is therefore possible to produce optical devices with an optical element for light concentration, wherein diffuse light can be produced by means of the optical element for light concentration even though the respective optical device does not have a conventional diffuser. Because of the non-disadvantageous omission of the conventional diffuser, achieved by means of the present disclosure, the respective optical device may be produced more economically, more easily and/or with a smaller space requirement. The present disclosure therefore facilitates miniaturization of the respective optical device.

The optical element provided by means of the present disclosure may be referred to as a diffuser-concentrator. It may be used multifariously.

In one advantageous embodiment of the optical element, the light transmission body has a light collection surface with a first area content on a first side and a light exit surface with a second area content, which is less than the first area content, on a second side. The optical element may therefore advantageously be used to concentrate a light incident through the light entry opening onto a relatively small input aperture arranged after the light exit opening, for example an input aperture of a spectrometer.

Furthermore, at least one central longitudinal axis extending from the light collection surface to the light exit surface and intersecting the light transmission body may be definable, wherein the diffusivity distribution of the light transmission body may be rotationally symmetrical with respect to the central longitudinal axis. The light transmission body therefore has an anisotropic diffusivity distribution, which is advantageous both for producing diffuse light and for concentrating the diffuse light produced.

In addition, the first subregion with the first diffusivity may lie on the light exit surface and have a varying layer thickness, which is minimal on the central longitudinal axis and maximal on the at least one reflective partial surface, while the second subregion with at least the second diffusivity lies on the light collection surface and has a varying layer thickness, which is maximal on the central longitudinal axis and minimal on the at least one reflective partial surface. As explained in more detail below, such a light transmission body may be produced relatively easily.

As an optional refinement, the second subregion of the light transmission body may have a laminate structure consisting of laminate layers with different diffusivities extending around the central longitudinal axis. Such a light transmission body may also be produced relatively easily.

Preferably, the light transmission body is formed at least partially from at least one matrix material which is transmissive for the predetermined wavelength range and is mixed with particles and/or gas bubbles, which scatter the predetermined wavelength range, as the at least one medium which is diffuse for the predetermined wavelength range. For example, the light transmission body may have PDMS, PMMA and/or SU8 as the at least one matrix material which is transmissive for the predetermined wavelength range, and/or titanium dioxide particles, silicon dioxide particles, melamine resin particles and/or polystyrene particles as the particles which scatter the predetermined wavelength range. In this way, economical and easily processable materials may be used to produce the light transmission body.

In a further advantageous embodiment of the optical element, the light transmission body is formed at least partially from at least one porous material as the at least one medium which is diffuse for the predetermined wavelength range. The local diffusivity may in this case be varied easily by means of a varying pore size of the pores formed in the porous material.

The advantages described above are, for example, achieved with a spectrometer having such an optical element. As explained in detail below, a multiplicity of different spectrometer types may be equipped with the corresponding optical element. The present disclosure is therefore multifariously usable.

A mobile apparatus having a corresponding optical element and/or such a spectrometer also often has the advantages described above. Since the present disclosure facilitates miniaturization of optical devices, it also contributes to the miniaturization of mobile apparatuses/portable apparatuses, for example a cell phone or a smart phone. Furthermore, the present disclosure facilitates integration of an optical device/spectrometer equipped with the optical element according to the disclosure into the respective mobile apparatus/portable apparatus.

Furthermore, carrying out a corresponding production method for an optical element for light concentration also achieves the advantages already explained above. It is explicitly to be pointed out that the production method may be refined according to the above-explained embodiments of the optical element.

BRIEF DESCRIPTION OF THE DRAWINGS

Further features and advantages of the present disclosure will be explained below with the aid of the figures, in which:

FIG. 3 shows a schematic representation of a first embodiment of a spectrometer;

FIG. 4 shows a schematic representation of a second embodiment of a spectrometer.

DETAILED DESCRIPTION

The term "diffusivity" used below is to be understood as a measure of how "directionally" light propagates (undirected) in a body transmitted by the light consisting of at least one diffuse medium. The diffusivity is directly proportional to a mean free path length between two scattering events of the transmissive light. (A directional light speed of individual photons remains unaffected by scattering events.)

Figure 1:
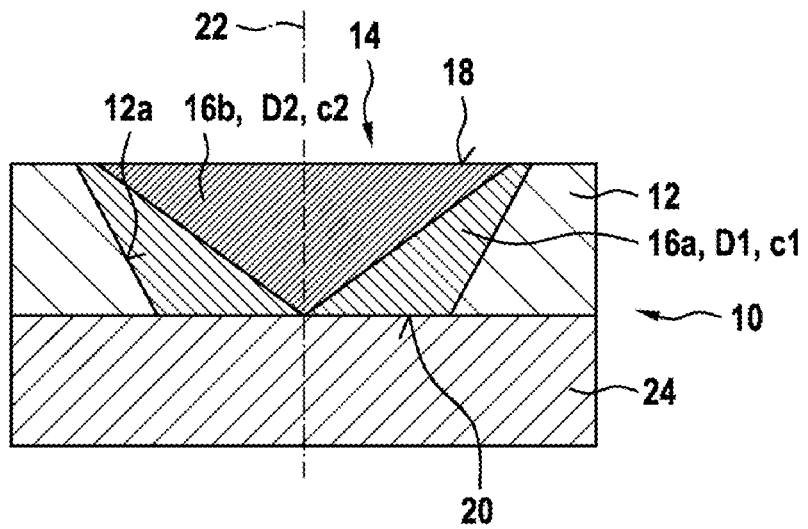
FIG. 1 shows a schematic representation of a first embodiment of an optical element for light concentration.

FIG. 1 shows a schematic representation of a first embodiment of the optical element for light concentration.

The optical element 10 schematically represented in FIG. 1 is configured for concentrating light in a predetermined wavelength range. The respective wavelength range may for example be the optical spectrum, a wavelength range of from 400 nm (nanometers) to 1100 nm (nanometers), a wavelength range of from 780 nm (nanometers) to 1100 nm (nanometers), a wavelength range of from 1100 nm (nanometers) to 2500 nm (nanometers), a wavelength range of from 400 nm (nanometers) to 2500 nm (nanometers) or a wavelength range of from 780 nm (nanometers) to 2500 nm (nanometers). The wavelength ranges listed here are, however, only to be interpreted as examples.

The optical element 10 comprises a holding sleeve 12, which is shaped in such a way that a light passage volume is framed by at least one reflective partial surface 12a of the holding sleeve 12. The holding sleeve 12 is preferably intended to be understood to mean a "stabilizing" holding sleeve 12. The at least one reflective partial surface 12a of the holding sleeve 12, which frames the light passage volume, may also be rewritten as a "reflective side wall". For example, the holding sleeve 12 may be formed (entirely) from at least one material which is reflective (for the predetermined wavelength range), such as in particular a metal, a semiconductor, a plastic (such as PTFE/polytetrafluoroethylene or Spectralon) and/or a ceramic (for example Accuratus Accuflect). At least one layer which is reflective (for the predetermined wavelength range) may likewise be applied to the at least one reflective partial surface 12a of the holding sleeve 12. The at least one layer which is reflective (for the predetermined wavelength range) may, in particular, be a layer stack of a plurality of layers which are reflective (for the predetermined wavelength range) or a Bragg mirror.

The optical element 10 furthermore has a light transmission body 14, with which the light passage volume is at least partially/entirely filled. The light transmission body 14 is transmissive at least for the predetermined wavelength range. The light transmission body 14 may, in particular, be transparent at least for the predetermined wavelength range. In addition, the light transmission body 14 is formed at least partially from at least one medium which is diffuse for the predetermined wavelength range, the light transmission body 14 having at least a first subregion 16a with (at least) one first diffusivity D1 and a second subregion 16b with (at least) one second diffusivity D2, which is different to the first diffusivity D1. Because of the formation of the light transmission body 14 from the at least one medium which is diffuse (for the predetermined wavelength range), the optical element 10 is advantageously suitable for producing diffuse light with a (substantially) homogeneous angle distribution. The optical element 10 is therefore suitable for use in a multiplicity of optical systems which require a maximally homogeneous intensity distribution and angle distribution of light. At the same time, because of the different diffusivities D1 and D2 in the at least two subregions 16a and 16b of its light transmission body 14, the optical element 10 may advantageously be used to concentrate light in the predetermined wavelength range. In particular, it is suitable for concentrating light in the predetermined wavelength range from a larger area to a smaller area and nevertheless for homogenizing its output angle distribution. The optical element 10 may therefore be referred to as a diffuser-concentrator.

Compared with an optical lens, the optical element 10, which may be referred to as a diffuser-concentrator, offers an increase in its "light collection efficiency" together with an extremely small overall height of the optical element 10. Preferably, the holding sleeve 12/the light transmission body 14 are shaped in such a way that the light passage volume/the light transmission body 14 have a light entry opening/light collection surface 18 with a first area content on a first side and a light exit opening/light exit surface 20 with a second area content, which is less than the first area content, on a second side. A distance, which may be referred to as the overall height of the optical element 10, between the light entry opening/light collection surface 18 and the light exit opening/light exit surface 20 may, for example, be less than a maximum extent of the light entry opening/light collection surface 18 and/or a maximum extent of the light exit opening/light exit surface 20. In particular, the distance between the light entry opening/light collection surface 18 and the light exit opening/light exit surface 20 may be less than one half of the maximum extent of the light entry opening/light collection surface 18 and/or than one half of the maximum extent of the light exit opening/light exit surface 20.

The openings/surfaces 18 and 20 may for example be round, elliptical, square and/or rectangular. The light passage volume/the light transmission body 14 may therefore have a frustoconical or frustopyramidal geometry. The openings/surfaces 18 and 20 may likewise be bounded by a general polygon. The first area content of the light entry opening/light collection surface 18 may, for example, be between 15 mm² (square millimeters) and 50 mm² (square millimeters). The second area content of the light exit opening/light exit surface 20 may, for example, be between 3 mm² (square millimeters) to 12 mm² (square millimeters). For example, a quotient of the first area content divided by the second area content may lie in a range of from 2 to 8.

Because of its relatively small overall height, its relatively small openings/surfaces 18 and 20 and its suitability as a diffuser-concentrator, the optical element 10 allows an extremely compact structure of an optical device equipped therewith. In addition, the advantageous properties of the optical element 10 facilitate miniaturization of the optical device equipped therewith. The optical element 10, which may be used as a diffuser-concentrator, may for example be used for an input aperture of a (miniaturized) spectrometer.

In the example of FIG. 1, the light transmission body 14 has a layer structure consisting of only the two subregions 16a and 16b with different diffusivities D1 and D2. Furthermore, a central longitudinal axis 22 extending from the light entry opening/light collection surface 18 to the light exit opening/light exit surface 20 and intersecting the light transmission body 14 may be defined for the optical element 10, the diffusivity distribution of the light transmission body 14 being rotationally symmetrical with respect to the central longitudinal axis 22. The first subregion 16a with the first diffusivity D1 lies on the light exit surface 20 and may therefore be referred to as the exit region 16a of the light transmission body 14. The exit region 16a has a varying layer thickness (oriented perpendicularly to the light exit surface 20), the layer thickness of the exit region 16a being minimal (for example tending toward zero) on the central longitudinal axis 22 and maximal on the at least one reflective partial surface 12a. Correspondingly, the second subregion 16b with the second diffusivity D2, which lies on the light collection surface 18 and may be referred to as the entry region 16b of the light transmission body 14, likewise has a varying layer thickness (oriented perpendicularly to the light collection surface 18). The varying layer thickness (oriented perpendicularly to the light collection surface 18) of the entry region 16b of the light transmission body 14 is maximal on the central longitudinal axis 22 and minimal (for example equal to zero) on the at least one reflective partial surface 12a of the holding sleeve 12.

In the light transmission body 14 shown in FIG. 1, the second diffusivity D2 is greater than the first diffusivity D1. The light transmission body 14 of FIG. 1 therefore has an anisotropic, direction-dependent diffusivity distribution, causes a concentration of the light transmitted through the light transmission body 14 from the larger light collection surface 18 to the smaller light exit surface 20, and optionally onto an input aperture arranged behind the latter. The optical element 10 may therefore be used well as a diffuser-concentrator. (Diffuse media conventionally used in a conventional diffuser generally have an isotropic diffusivity/diffusivity distribution. In a conventional diffuser, light propagation therefore usually takes place "equally fast" in all directions.)

In order to establish/adjust the diffusivity distribution/the (local) diffusivities D1 and D2 in the light transmission body 14, it is possible to use randomly arranged scattering centers which lead to multiple scattering of the light transmitted by the light transmission body 14 and to randomization of its propagation direction. (The scattering centers may also be rewritten as "dielectric scatterers".) The (local) diffusivity D1 or D2 is (because of its proportionality to the mean free path length between two scattering events) inversely proportional to a local concentration c1 and c2 of scattering centers randomly arranged in the light transmission body 14. In the example of FIG. 1, the first subregion 16a with the first diffusivity D1 has a first local concentration c1 of randomly arranged scattering centers, which is greater than a second local concentration c2 of randomly arranged scattering centers of the second subregion 16b with the second diffusivity D2.

Preferably, the light transmission body 14 is formed at least partially from at least one matrix material which is transmissive/transparent for the predetermined wavelength range and which is mixed with particles and/or gas bubbles/air bubbles (as scattering centers) which scatter the predetermined wavelength range (as the at least one medium which is diffuse for the predetermined wavelength range). (As already mentioned above, this case the at least two subregions 16a and 16b of the light transmission body 14 have different concentrations c1 and c2 of scattering particles and/or gas bubbles.) The at least two subregions 16a and 16b of the light transmission body 14 may be formed either from the at least one identical matrix material or from different matrix materials. For example, PDMS (polydimethylsiloxane), PMMA (polymethyl methacrylate) and/or SU8 (photoresist from Microchem Corp.) may be used as the at least one matrix material which is transmissive/transparent for the predetermined wavelength range. The light transmission body 14 may for example have titanium dioxide particles (TiO2), silicon dioxide particles (SiO2), melamine resin particles (MF) and/or polystyrene particles as the particles which scatter the predetermined wavelength range. Economical and easily processable materials may therefore be used for forming the light transmission body 14.

As an alternative, the light transmission body 14 may also be formed at least partially from at least one porous material (as the at least one medium which is diffuse for the predetermined wavelength range). For example, silicon may be used as the at least one porous material. In this case, the at least two subregions 16a and 16b of the light transmission body 14 may have different concentrations c1 and c2 of pores and/or may have deviating mean pore diameters. (The at least two subregions 16a and 16b of the light transmission body 14 may be formed either from the at least one identical porous material or from different porous materials.)

The above-described components of the optical element 10 may be arranged/formed on a substrate 24 which is transmissive/transparent for the predetermined wavelength range. The optical element 10 may, however, also be provided without the substrate 24.

Figure 2:
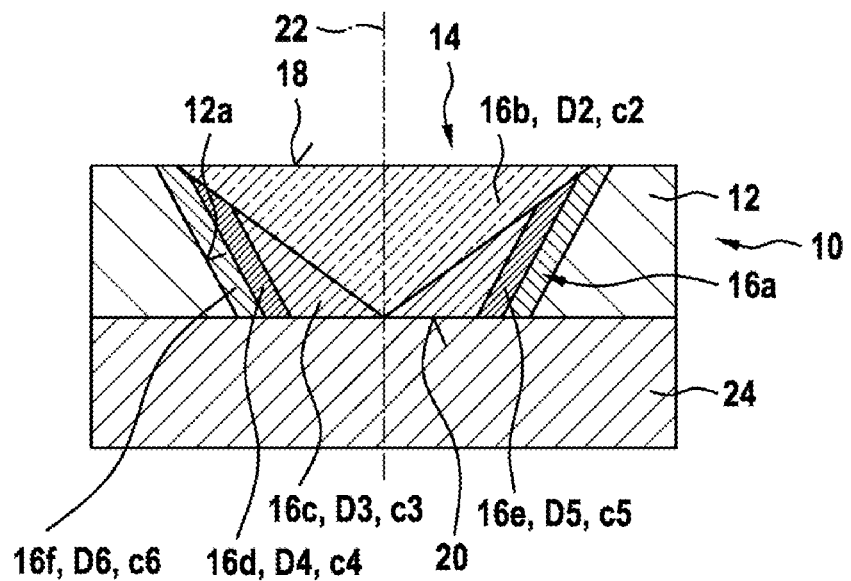
FIG. 2 shows a schematic representation of a second embodiment of an optical element for light concentration.

FIG. 2 shows a schematic representation of a second embodiment of an optical element for light concentration.

The light transmission body 14 schematically represented in FIG. 2 has the entry region 16b already described above with the second diffusivity D2, the entry region 16b lying on the light collection surface 18 and having a varying layer thickness (oriented perpendicularly to the light collection surface 18), which is maximal on the central longitudinal axis 22 and minimal (for example tends toward zero) on the at least one reflective partial surface 12a of the holding sleeve 12. In contrast to the embodiment described above, however, the exit region 16c to 16f of the light transmission body 14 of FIG. 2 has a laminate structure consisting of laminate layers 16c to 16f with different diffusivities D3 to D6 extending around the central longitudinal axis 22. (The exit region 16c to 16f formed from the laminate layers 16c to 16f again has a varying layer thickness (oriented perpendicularly to the light exit surface 20) which is minimal (for example tends toward zero) on the central longitudinal axis 22 and maximal on the at least one reflective partial surface 12a.) The diffusivities D3 to D6 of the laminate layers 16c to 16f may be configured in such a way that a laminate layer 16d with a diffusivity D4 less than the second diffusivity D2 in each case lies between two laminate layers 16c and 16e respectively with a diffusivity D3 and D5 greater than the second diffusivity D2, and a laminate layer 16e with a diffusivity D5 greater than the second diffusivity D2 in each case lies between two laminate layers 16d and 16f respectively with a diffusivity D4 and D6 less than the second diffusivity D2. In a simplified way, the diffusivity D3 and D5 and/or the diffusivity D4 and D6 may respectively be equal. (The graphical representation of the "higher" diffusivity D3 in the middle of the exit region 16c to 16f is only exemplary; as an alternative, a "lower" diffusivity could also be formed centrally. Correspondingly, either the local concentrations c3 and c5 may also be less than the local concentration c2 and the local concentrations c4 and c6 may be greater than the local concentration c2, or the local concentrations c3 and c5 may be greater than the local concentration c2 and the local concentrations c4 and c6 may be less than the local concentration c2.)

The light propagation along the laminate layers 16c to 16f therefore takes place preferably with respect to light propagation perpendicular to the laminate layers 16c to 16f. The orientation of the laminate layers 16c to 16f with respect to a center of the light exit surface 20 therefore causes light concentration of the light diffusing through the light transmission body 14. The optical element of FIG. 2 is therefore also highly suitable as a diffuser-concentrator.

With respect to further features of the optical element 10 of FIG. 2, reference is made to the preceding embodiment.

Instead of a layer structure of the light transmission body 14 as explained with the aid of the preceding examples, the light transmission body 14 may also have a gradual variation of the local diffusivity, for example by means of a gradual variation of the local concentrations of scattering centers.

FIG. 3 shows a schematic representation of a first embodiment of a spectrometer.

The spectrometer schematically represented in FIG. 3 is, by way of example, a static Fourier transform spectrometer. As the input aperture, the spectrometer has an optical element 10 configured as a diffuser-concentrator. (As an alternative, however, such an optical element may also be used in a beam path of a spectrometer/microspectrometer.)

A polarizer 30, which polarizes the light emerging from the light transmission body 14 (at an angle of 45° with respect to the image plane), is fitted next to the light exit surface 20 of the optical element 10/its light transmission body 14. Arranged after the polarizer 30, there is a Savart element 32 consisting of two differently oriented birefringent crystals, which split the polarized light into a ray bundle polarized parallel/horizontally (with respect to the image plane) and a ray bundle polarized perpendicularly/vertically (with respect to the image plane). The two ray bundles travel along a light path of different length through the two birefringent crystals of the Savart element 32, depending on the polarization and angle of incidence. An optical path length difference between the two ray bundles is therefore dependent on an angle of incidence of the light emerging from the optical element 10. Subsequently, a further polarizer 34 projects the two ray bundles together again (at an angle of 45° with respect to the image plane), so that the light of the two ray bundles can mutually interfere. Subsequently, a lens system 36 images all light rays with the same angle of incidence onto the same detection region of a detector array 38. The light interferes constructively or destructively, depending on the phase difference. By means of the detector array 38, a 2D interference pattern is therefore obtained, from which a spectrum may be determined by means of a Fourier transform.

Equipping the spectrometer of FIG. 3 with the optical element 10 ensures uniform illumination of the spectrometer components 30 to 36 arranged after the optical element 10. Because of the concentration of the light striking the relatively large light collection surface 18 onto the significantly smaller light exit surface 20, the "luminously intense" spectrometer may be produced with a relatively small volume.

FIG. 4 shows a schematic representation of a second embodiment of a spectrometer.

The type of spectrometer depicted by means of FIG. 4 has the optical element 10 configured as a diffuser-concentrator as the input aperture. (With this type of spectrometer as well, the optical element 10 may alternatively be used in a beam path.)

The incident light is initially distributed uniformly in intensity and angle by means of the optical element 10. The light emerging from the optical element 10 is optionally filtered by means of a bandpass filter 40. An angle-dependent filter element 42, for example a Fabry-Pérot interferometer 42, is arranged after the (optional) bandpass filter 40. By means of a lens 44, the light emerging from the angle-dependent filter element 42 is subsequently imaged onto a detector array 46 in such a way that different angles of incidence, or wavelengths, strike different detection regions of the detector array 46.

In the embodiment of FIG. 4 as well, the optical element 10 allows a maximally homogeneous intensity distribution and angle distribution.

Because they are equipped with the optical element 10, all the spectrometers described above have a compact design. By increasing the light collection surface 18 with constant dimensioning of the subsequent components, more light can be collected. As an alternative, by reducing the light exit surface 20 (in relation to the light collection surface 18), the respective spectrometer may also be minimized without significant additional costs.

Because of their relatively small size, all the optical elements and spectrometers described above are highly suitable for use in a mobile apparatus, for example a cell phone or a smart phone.

FIGS. 5a to 5f show schematic cross sections to explain one embodiment of the production method for an optical element for light concentration.

In one execution of the production method described here, a holding sleeve 12 of the future optical element is initially shaped in such a way that a light passage volume is framed by at least one reflective partial surface 12a of the holding sleeve 12. To this end, a sleeve material 50, for example a semiconductor material (silicon), a metal and/or a plastic, is deposited on a substrate 24 (see FIG. 5a). Preferably, a substrate 24 which is transmissive/transparent for the wavelength range predetermined for the light concentration is used as the substrate 24. In this case, subsequent removal of the substrate 24 may be obviated.

Figure 5A:
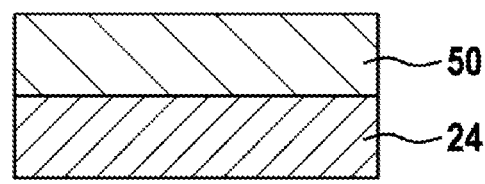
FIGS. 5a to 5f show schematic cross sections to explain an embodiment of a production method for an optical element for light concentration.
Figure 5B:
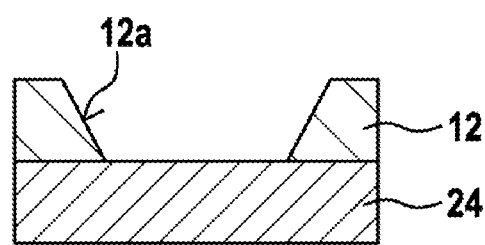

FIG. 5b shows structuring of the holding sleeve 12 from the sleeve material 50. The structuring of the sleeve material 50 may, for example, be carried out by means of an anisotropic etching process.

Instead of the method steps depicted in FIGS. 5a and 5b, the holding sleeve 12 may also be produced by means of injection molding, machining on a lathe, an embossing method, milling, 3D printing or grayscale lithography. As an alternative, a wafer piece may also be taken and anisotropically structured into the desired shape of a multiplicity of holding sleeves 12.

In the case of a still insufficient reflectivity of the at least one reflective partial surface 12a, framing the light passage volume, of the holding sleeve 12, the at least one partial surface 12a may also additionally be smoothed (in particular by a reflow process) and/or mirrored (for example by applying at least one reflective layer).

By means of the further method steps, a light transmission body 14 of the subsequent optical element 10 is formed in such a way that the light transmission body is transmissive at least for the predetermined wavelength range. In this case, the light passage volume is at least partially filled with the light transmission body 14. The light transmission body 14 is formed at least partially from at least one medium, which is diffuse for the predetermined wavelength range, in such a way that the light transmission body 14 has at least one first subregion 16a with (at least) one first diffusivity D1 and a second subregion 16b with (at least) one second diffusivity D2, which is different to the first diffusivity D1. In the embodiment described here, by way of example, the light transmission body 14 is formed only with the two subregions 16a and 16b with a total of two different diffusivities D1 and D2. Implementability of the production method described here is not, however, limited to such a light transmission body 14.

Figure 5C:
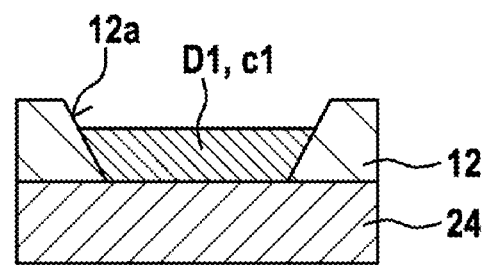

In the embodiment described here, as schematically depicted in FIG. 5c, a matrix material (for example PDMS) with a first (local) concentration c1 of scattering particles used as scattering centers is initially introduced into the future light scattering volume. The scattering particles may, for example, be titanium dioxide particles.

Figure 5D:
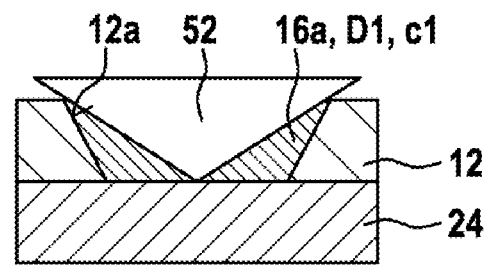
Figure 5E:
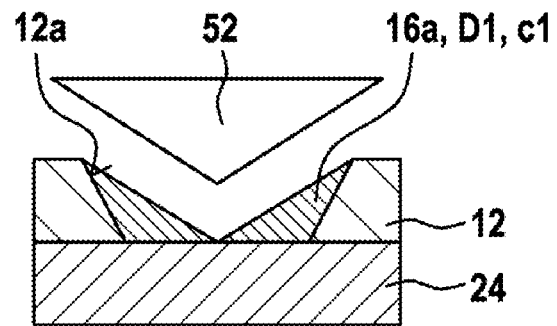

FIG. 5d shows an embossing process, by means of which the future first subregion 16a of the light transmission body 14 is brought into its shape already described above. The embossing process may be carried out easily and reliably by means of techniques known from nanoembossing lithography. FIG. 5e shows the shaped first subregion 16a with the first diffusivity D1 after removal of a die 52 used for the embossing.

Figure 5F:
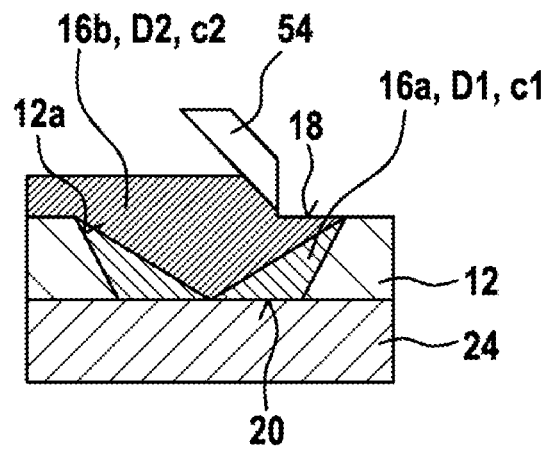

In a further method step, which is schematically depicted by means of FIG. 5f, the same matrix material but with a second concentration c2 of scattering particles, which is different to the first concentration c1, is introduced into a still unfilled remainder of the light passage volume. By means of a blade 54, a smooth light collection surface 18 of the light transmission body 14 manufactured in this way may be ensured. The substrate 24 may then optionally be removed.

The method steps explained above may also be carried out at the wafer level. In one refinement of the production method schematically depicted by means of FIGS. 5a to 5f, a plurality of embossing steps may be carried out in order to produce the lamellar structure represented in FIG. 2.

The above-described use of scattering particles as randomly distributed scattering centers is to be understood as merely exemplary. A (local) concentration c1 or c2 of scattering centers in the light transmission body 14 may, for example, be established by means of a Monte Carlo simulation of desired light propagation. The greater the quotient of the first area content of the light collection surface 18 divided by the second area content of the light exit surface 20 is, and the smaller a distance between the light collection surface 18 and the light exit surface 20 is, the more advantageous in a strong diffusivity contrast.

The invention claimed is:

1. An optical element for light concentration for a predetermined wavelength range, comprising:
    a holding sleeve having at least one reflective partial surface, the holding sleeve shaped such that a light passage volume is framed by the at least one reflective partial surface; and
    a light transmission body, with which the light passage volume is at least partially filled and which is transmissive at least for the predetermined wavelength range, the light transmission body formed at least partially from at least one medium which is diffuse for the predetermined wavelength range, the light transmission body comprising at least a first subregion with at least one first diffusivity and a second subregion with at least one second diffusivity, which is different from the first diffusivity.

2. The optical element as claimed in claim 1, the light transmission body further comprising:
    a light collection surface with a first area content on a first side; and
    a light exit surface with a second area content, which is less than the first area content, on a second side.

3. The optical element as claimed in claim 2, wherein:
    the optical element defines at least one central longitudinal axis extending from the light collection surface to the light exit surface and intersecting the light transmission body; and
    a diffusivity distribution of the light transmission body is rotationally symmetrical with respect to the central longitudinal axis.

4. The optical element as claimed in claim 3, wherein:
    the first subregion with the first diffusivity lies on the light exit surface and has a first varying layer thickness, which is minimal on the central longitudinal axis and maximal on the at least one reflective partial surface, and
    the second subregion with at least the second diffusivity lies on the light collection surface and has a second varying layer thickness, which is maximal on the central longitudinal axis and minimal on the at least one reflective partial surface.

5. The optical element as claimed in claim 4, wherein the second subregion of the light transmission body has a laminate structure comprising laminate layers with different diffusivities extending around the central longitudinal axis.

6. The optical element as claimed in claim 1, wherein the light transmission body is formed at least partially from at least one matrix material which is transmissive for the predetermined wavelength range and is mixed with particles and/or gas bubbles, which scatter the predetermined wavelength range, as the at least one medium which is diffuse for the predetermined wavelength range.

7. The optical element as claimed in claim 6, wherein the light transmission body includes at least one of PDMS (polydimethylsiloxane), PMMA (polymethyl methacrylate), and SU8 photoresist as the at least one matrix material which is transmissive for the predetermined wavelength range, and/or the light transmission body includes titanium dioxide particles, silicon dioxide particles, melamine resin particles and/or polystyrene particles as the particles that scatter the predetermined wavelength range.

8. The optical element as claimed in claim 1, wherein the light transmission body is formed at least partially from at least one porous material as the at least one medium which is diffuse for the predetermined wavelength range.

9. A mobile apparatus comprising:
    the optical element as claimed in claim 1; and/or
    a spectrometer comprising the optical element.

10. A spectrometer having comprising:
    an optical element for light concentration for a predetermined wavelength range, the optical element comprising:
        a holding sleeve having at least one reflective partial surface, the holding sleeve shaped such that a light passage volume is framed by the at least one reflective partial surface; and
        a light transmission body, with which the light passage volume is at least partially filled and which is transmissive at least for the predetermined wavelength range, the light transmission body formed at least partially from at least one medium which is diffuse for the predetermined wavelength range, the light transmission body comprising at least a first subregion with at least one first diffusivity and a second subregion with at least one second diffusivity, which is different from the first diffusivity.

11. A method for producing an optical element for light concentration for a predetermined wavelength range, the method comprising:

forming a holding sleeve, which is shaped in such a way that a light passage volume is framed by at least one reflective partial surface of the holding sleeve; and forming a light transmission body in such a way that the light transmission body is transmissive at least for the predetermined wavelength range;

wherein the light passage volume is at least partially filled with the light transmission body, and wherein the light transmission body is formed at least partially from at least one medium which is diffuse for the predetermined wavelength range in such a way that the light transmission body has at least a first subregion with at least one first diffusivity and a second subregion with at least one second diffusivity, which is different from the first diffusivity.

\* \* \* \* \*